United States Patent
Ooki et al.

(10) Patent No.: US 8,234,364 B2
(45) Date of Patent: Jul. 31, 2012

(54) INTERNET CONNECTION SYSTEM

(75) Inventors: Yasuomi Ooki, Kanagawa (JP);
Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 3069 days.

(21) Appl. No.: 10/668,260

(22) Filed: Sep. 24, 2003

(65) Prior Publication Data

US 2005/0261915 A1 Nov. 24, 2005

(30) Foreign Application Priority Data

Nov. 22, 2002 (JP) ................................ 2002-339334

(51) Int. Cl.
*G06F 15/173* (2006.01)
(52) U.S. Cl. .................... 709/224; 709/226; 379/114.07; 379/114.28; 705/34; 705/26.3; 705/26.2
(58) Field of Classification Search .................. 709/223, 709/224, 245; 713/176; 705/32, 34; 370/468, 370/352, 353
See application file for complete search history.

(56) References Cited

U.S. PATENT DOCUMENTS

| | | | | |
|---|---|---|---|---|
| 5,970,477 A | * | 10/1999 | Roden | 705/32 |
| 5,987,430 A | * | 11/1999 | Van Horne et al. | 705/34 |
| 6,157,636 A | * | 12/2000 | Voit et al. | 370/353 |
| 6,324,525 B1 | * | 11/2001 | Kramer et al. | 705/40 |
| 6,789,110 B1 | * | 9/2004 | Short et al. | 709/221 |
| 7,116,682 B1 | * | 10/2006 | Waclawsky et al. | 370/468 |
| 7,171,460 B2 | * | 1/2007 | Kalavade et al. | 709/223 |
| 7,515,697 B2 | * | 4/2009 | Eng et al. | 379/115.01 |
| 7,530,102 B2 | * | 5/2009 | Moskowitz | 726/13 |
| 7,562,393 B2 | * | 7/2009 | Buddhikot et al. | 726/26 |
| 2002/0033416 A1 | * | 3/2002 | Gerszberg et al. | 235/380 |
| 2002/0075844 A1 | * | 6/2002 | Hagen | 370/351 |
| 2002/0112076 A1 | * | 8/2002 | Rueda et al. | 709/245 |
| 2002/0133412 A1 | * | 9/2002 | Oliver et al. | 705/26 |
| 2003/0153338 A1 | * | 8/2003 | Herz et al. | 455/517 |
| 2003/0172145 A1 | * | 9/2003 | Nguyen | 709/223 |
| 2003/0200439 A1 | * | 10/2003 | Moskowitz | 713/176 |
| 2004/0243503 A1 | * | 12/2004 | Eng et al. | 705/37 |
| 2006/0239254 A1 | * | 10/2006 | Short et al. | 370/352 |
| 2007/0008927 A1 | * | 1/2007 | Herz et al. | 370/331 |

FOREIGN PATENT DOCUMENTS

| | | |
|---|---|---|
| JP | 2002-016650 | 1/2002 |
| JP | 2002-198959 | 7/2002 |
| JP | 2002-271386 | 9/2002 |
| JP | 2002-271387 | 9/2002 |
| JP | 2002-300324 | 10/2002 |

* cited by examiner

*Primary Examiner* — Greg C Bengzon
(74) *Attorney, Agent, or Firm* — Whitham, Curtis, Christofferson & Cook, P.C.

(57) ABSTRACT

In an internet connection system for connecting a terminal in each of a plurality of predetermined locations to internet accessed by the terminal, each location, in which a terminal in communication is provided, is discriminated. The used communication band is recorded for each location, and a communication fee is determined based on the used communication band recorded for each location. The communication extent of the access line connected via the gateway is compared for each location, and the terminal is connected to internet via the gateway, to which a less communication extent access line is connected.

4 Claims, 8 Drawing Sheets

| MAC ADDRESS | ROOM NUMBER | TOTAL COMMUNI- CATION EXTENT | RATIO TO TOTAL COMMUNI- CATION EXTENT OF ALL ROOMS | FEE |
|---|---|---|---|---|
| EXAMPLE: 11.22.33.44.55.66 | EXAMPLE: 101 | EXAMPLE: 161 KByte | EXAMPLE: 1% | EXAMPLE: ¥1500 |
| EXAMPLE: 22.33.44.55.66.77 | EXAMPLE: 102 | EXAMPLE: 680 KByte | EXAMPLE: 1% | EXAMPLE: ¥1500 |
| ... | ... | ... | ... | ... |

| MAC ADDRESS 81 | ROOM NUMBER 82 | TIME ZONE 83 | MAXIMUM COMMUNI-CATION BANDS IN THE TIME ZONES 84 | RATIO TO TOTAL COMMUNI-CATION EXTENT OF ALL ROOMS 85 | FEE 86 |
|---|---|---|---|---|---|
| EXAMPLE: 11.22.33.44.55.66 | EXAMPLE: 101 | EXAMPLE: 03:00−07:00 07:00−10:00 10:00−00:00 | EXAMPLE: 161KByte | EXAMPLE: 1% | EXAMPLE: ¥1500 |
| EXAMPLE: 22.33.44.55.66.77 | EXAMPLE: 102 | EXAMPLE: 03:00−07:00 07:00−10:00 10:00−00:00 | EXAMPLE: 680KByte | EXAMPLE: 1% | EXAMPLE: ¥1500 |
| ... | ... | ... | ... | ... | ... |

INTERNET CONNECTION SYSTEM

BACKGROUND OF THE PRESENT INVENTION

This application claims benefit of Japanese Patent Application No. 2002-339334 filed on Nov. 22, 2002, the contents of which are incorporated by the reference.

The present invention relates to internet connection systems and, more particularly, to internet connection systems capable of precluding such user's claim that use fees in the case of common internet connection in a collective condominium or a building are fixed irrespective of different communication bands and also increasing the profit of the internet access line dealer or the manager of the collective condominium or the building.

In the prior art internet connection system of this type, terminals of a plurality of rooms each having each terminal, commonly use a single internet access circuit and a single gateway. Heretofore, in the case of common use of an internet access line, the maximum communication band of each room has been fixed, and uniform services are provided while charging a fixed fee.

In such internet connection systems, in the case of common use of internet access line in a collective condominium or a building, the frequency of internet use and the time zone of the maximum frequency of internet use vary with the purposes of use and the personnel constitution of each room (residence, office, shop, etc.). Nevertheless, in the prior art method, only a fixed communication band has been allotted to each room, and the fee of use has been commonly fixed for each room. This means a fixed fee of use even in the case where the communication band is not used so much or the case where the communication band is fully used, and the unevenness has been felt deeply. Furthermore, depending on the time zone or congestion degree, there may be a case that the communication band is insufficient or redundant, and it has been unsatisfactory that the communication band can not be effectively utilized.

SUMMARY OF THE PRESENT INVENTION

An object of the present invention is to provide an internet connection system capable of even communication band distribution by allotting a redundant or excess communication band is allotted to a different room in the case of common use of an internet access line in a collective condominium or a building.

Another object of the present invention is to provide an internet connection system capable of evenly presetting the communication fee of each room based on the communication band used.

According to a first aspect of the present invention, there is provided an internet connection system for connecting a terminal in each of a plurality of predetermined locations to internet accessed by the terminal, wherein: each location, in which a terminal in communication is provided, is discriminated, the used communication band is recorded for each location, and a communication fee is determined based on the used communication band recorded for each location.

According to a second aspect of the present invention, there is provided an internet connection system for connecting a terminal on each of a plurality of predetermined locations to internet accessed by the terminals wherein: locations, in which terminals in communication are provided, are discriminated, and communication bands are dynamically distributed from locations of redundant communication bands to locations of insufficient communication bands.

According to a third aspect of the present invention, there is provided an internet connection system, wherein: at least one terminal provided in each of a plurality of predetermined locations is connected to internet via a gateway commonly used by at least two locations and an access line; and locations, in which terminals in communication are provided, are discriminated, the used communication band is recorded for each Location, and a communication fee is computed based on the used communication band recorded for each location.

According to a fourth aspect of the present invention, there is provided an internet connection system, wherein: at least one terminal and a gateway connected to the terminal are provided in each of a plurality of predetermined locations, the terminal being connected to internet via an access line connected to the gateway in each location; and locations, in which terminals in communication are provided, is discriminated, the used communication band is recorded for each location, and a communication fee is computed based on the used communication band recorded for each location.

According to a fifth aspect of the present invention, there is provided an internet connection system, wherein: at least one terminal and a gateway connected to the terminal are provided in each of a plurality of predetermined locations, the terminal being connected to internet via an access line connected to the gateway in each location; and locations, in which terminals in communication are provided, is discriminated, the used communication band is recorded for each location, and a communication fee is computed based on the used communication band recorded for each location.

According to a sixth aspect of the present invention, there is provided an internet connection system, wherein: at least one terminal and a gateway connected to the terminal are provided in each of a plurality of predetermined locations, the terminal being connected to internet via an access line connected to the gateway in each location; and the communication extent of the access line connected via the gateway is compared for each location, the terminal being connected to internet via the gateway, to which a less communication extent access line is connected.

According to a seventh aspect of the present invention, there is provided an internet connection system, wherein: at least one terminal and a gateway connected to the terminal are provided in each of a plurality of predetermined locations, the terminal being connected to internet via an access line connected to the gateway in each location; the communication extent of the access line connected via the gateway is compared for each location, the terminal being connected to internet via the gateway, to which a less communication extent access line is connected; and locations, in which terminals in communication are provided, is discriminated, the used communication band is recorded for each location, and a communication fee is computed based on the used communication band recorded for each location.

According to an eighth aspect of the present invention, there is provided an internet system, wherein: at least one wireless terminal and a wireless LAN base station wireless LAN connected to the wireless terminal are provided in each of a plurality of predetermined locations; at least one wireless terminal wireless LAN connected to the wireless LAN base station belonging to the afore-said one location is provided in a different location adjacent to the afore-said location; and the wireless terminal is connected to internet via the gateway connected to the wireless LAN base station and an access line connected to the gateway.

According to a ninth aspect of the present invention, there is provided an internet system, wherein: at least one wireless terminal and a wireless LAN base station wireless LAN connected to the wireless terminal are provided in each of a plurality of predetermined locations; at least one wireless terminal wireless LAN connected to the wireless LAN base station belonging to the afore-said one location is provided in a different location adjacent to the afore-said location; the wireless terminal is connected to internet via the gateway connected to the wireless LAN base station and an access line connected to the gateway; and locations, in which terminals in communication are provided, is discriminated, the used communication band is recorded for each location, and a communication fee is computed based on the used communication band recorded for each location.

According to a tenth aspect of the present invention, there is provided an internet connection system, wherein: at least one wireless terminal and a wireless LAN base station wireless LAN connected to the wireless terminal are provided in each of a plurality of predetermined locations; each wireless terminal is also wireless LAN connected to the wireless LAN base station in a location other than the own location; the wireless LAN base stations belonging to the plurality of locations are connected to a common gateway and connected to internet via an access line connected to the gateway; and the speed of communication between the wireless terminal in communication and the wireless LAN base station belonging to a different location wireless LAN connected to the wireless terminal in communication, the wireless terminal being connected to internet via a wireless LAN base station of a higher measured communication speed, the gateway and the access line.

According to an eleventh aspect of the present invention, there is provided an internet connection system, wherein: at least one wireless terminal and a wireless LAN base station wireless LAN connected to the wireless terminal are provided in each of a plurality of predetermined locations; each wireless terminal is also wireless LAN connected to the wireless LAN base station in a location other than the own location; the wireless LAN base stations belonging to the plurality of locations are connected to a common gateway and connected to internet via an access line connected to the gateway; the speed of communication between the wireless terminal in communication and the wireless LAN base station belonging to a different location wireless LAN connected to the wireless terminal in communication, the wireless terminal being connected to internet via a wireless LAN base station of a higher measured communication speed, the gateway and the access line; and locations, in which terminals in communication are provided, is discriminated, the used communication band is recorded for each location, and a communication fee is computed based on the used communication band recorded for each location.

According to a twelfth aspect of the present invention, there is provided an internet connection system, wherein: at least one wireless terminal and a wireless LAN base station wireless LAN connected to the wireless terminal are provided in each of a plurality of predetermined locations; each wireless terminal is also wireless LAN connected to the wireless LAN base station in a location other than the own location; the wireless LAN base stations belonging to the plurality of locations are respectively connected to gateways and connected to internet via an access line connected to the gateway; and the speed of communication between the wireless terminal in communication and the wireless LAN base station belonging to a different location wireless LAN connected to the wireless terminal in communication, the wireless terminal being connected to internet via a wireless LAN base station of a higher measured communication speed, the gateway and the access line.

According to a thirteenth aspect of the present invention, there is provided an internet connection system, wherein: at least one wireless terminal and a wireless LAN base station wireless LAN connected to the wireless terminal are provided in each of a plurality of predetermined locations; each wireless terminal is also wireless LAN connected to the wireless LAN base station in a location other than the own location; the wireless LAN base stations belonging to the plurality of locations are respectively connected to gateways and connected to internet via an access line connected to the gateway; the speed of communication between the wireless terminal in communication and the wireless LAN base station belonging to a different location wireless LAN connected to the wireless terminal in communication, the wireless terminal being connected to internet via a wireless LAN base station of a higher measured communication speed, the gateway and the access line; and locations, in which terminals in communication are provided, is discriminated, the used communication band is recorded for each location, and a communication fee is computed based on the used communication band recorded for each location.

The maximum communication speed is preset for each location, the communication operation is set to a waiting state when the communication band sum in the location, in which the terminal is provided, exceeds the maximum communication speed and is resumed when the communication band becomes lower than the maximum communication speed. A user in one location uses the communication band of a user in a different location, and the user in the afore-said location pays the use fee to the user in the different location. A signal permitting only terminals having preliminarily registered MAC addresses is outputted, and the MAC addresses, the numbers of the locations, in which the terminals are provided, the total communication extents of the terminals, the ratios of the total communication extents of the terminals to the total communication speeds of all the locations, and the distributions of the ratios are used for fee computation. The internet connection systems according to one of claims 1 to 13, wherein the locations are rooms.

Other objects and features will be clarified from the following description with reference to attached drawings.

PREFERRED EMBODIMENTS OF THE PRESENT INVENTION

Preferred embodiments of the present invention will now be described with reference to the drawings.

Basically, according to the present invention, in the case of common use of an internet access line in, for instance, a condominium or a building a redundant or excess communication band is allotted to a different room, if any, and the communication fee of each room is subject to variation based on the communication band used.

Figure 1:
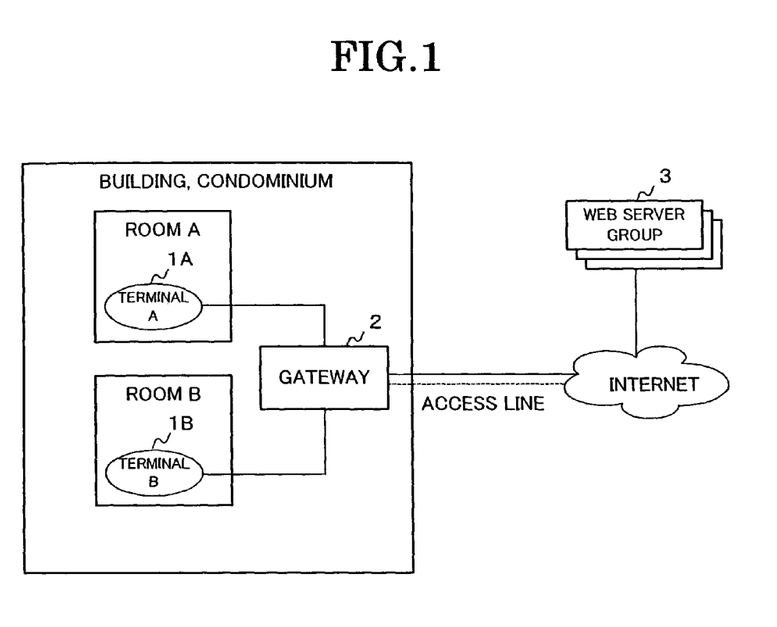
FIG. 1 shows a system structure of a first embodiment of the internet connection system according to the present invention.

FIG. 1 is a view showing a first embodiment of the internet connection system according to the present invention.

Referring to FIG. 1, a terminal 1A of a room A and a terminal 1B of a room B commonly use one internal access line led to a WEB server group 3 with a single gateway 2.

Heretofore, in the case where an internet access line is commonly used, the maximum communication band of each room is fixed, and uniform services are provided at a fixed fee. According to the present invention, user's room with terminals occupied in communication are discriminated, a communication band used (i.e., quantity of transmitted and received data) is recorded for each room, and the communication fee is computed for each room based on the communication band used on the basis of the recorded data.

According to the present invention, even with fluctuations of the frequency of use and the time zone of the maximum number of times of use in dependence on the purposes of use each room (such as residence, office and shop) or personal constitution, dynamic communication band allotting from an excess communication band room to an insufficient communication band room, and communication fees are allotted in dependence on the magnitude of the total used communication band, thus realizing even communication band distribution. As a result, it is possible to reduce the communication fee for a room which has not used so much band, while to allot further communication band to a room which requires further communication band.

In the embodiment shown in FIG. 1, it is assumed as an example that a building constituted by a room A and a room B commonly using one internet access line via a common gateway 2. The room A includes a terminal 1A for internet accessing, and the room B includes a terminal 1B also for internet accessing. For the sake of the brevity of description, in this embodiment each room is assumed to include one terminal, but it is also possible that each room includes a plurality of terminals.

In the above description, the term "room" does not merely mean the room used in the usual sense but also of course means a location or area defined in a predetermined definition.

Figure 2:
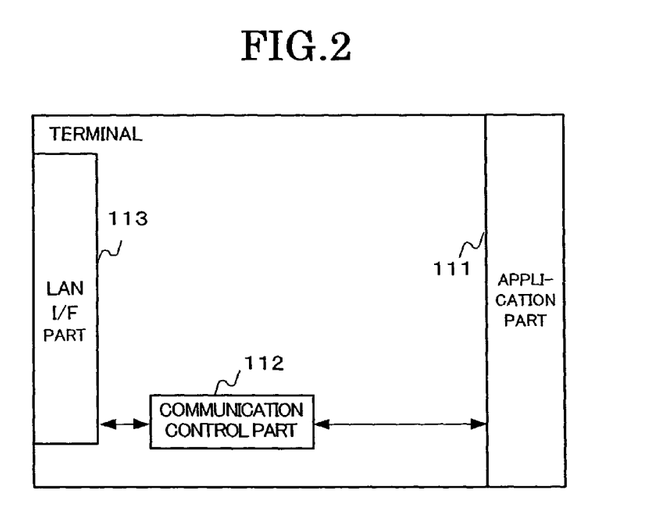
FIG. 2 shows a structure of the terminal of the first embodiment according to the present invention.

The terminal 1A has an arrangement as shown in FIG. 2, that is, it includes an application part 111, a communication control part 112 and a wireless LAN I/F part 113. These process parts operate roughly as follows.

The application part 111 provides a display to the user, detects input by the user, and instructs the communication start and stop to the communication control part 112. The communication control part 112 sends out the data received from the LAN I/F part 113 to the application part 111, and also sends out the data, which is requested by the application part 111 for transmission, to the LAN I/F part 113. The LAN I/F part 113 sends out and receives the data on the LAN line.

Figure 3:
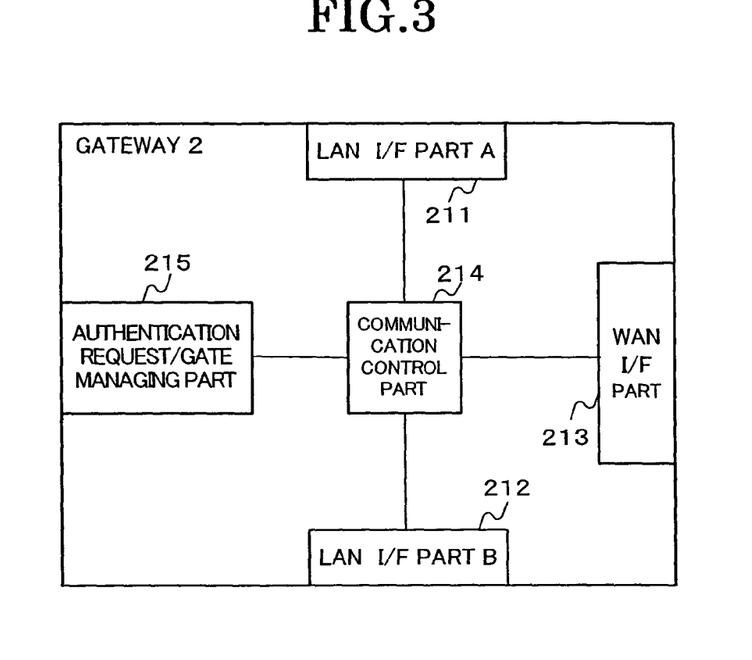
FIG. 3 shows a structure of the gateway of the first embodiment according to the present invention.

The gateway 2 has an arrangement as shown in FIG. 3, that is, it includes a LAN I/F part A211, a LAN I/F part B212, a WAN I/F part 213, a communication control part 214, and an authentication request/gate managing part 215. These process parts roughly operate as follows.

The LAN I/F part A211 sends out and receives the data on the LAN line of the room A. The LAN I/F part B212 sends out and receives the data to and from the LAN line of the room B. The WAN I/F part 213 sends out and receives the data with respect to various servers (i.e., WEB server part) on the internet via the internet circuit.

The communication control part 214 controls the communication between the LAN I/F part A211 and the WAN I/F part 213 and also between the LAN I/F part B212 and the WAN I/F part 213. The authentication request/gate managing part 215 is adapted to permit only terminals having registered MAC addresses to do internet communication, and is referred to via the communication control part 214. Also, as will be described later, the part 215 manages the total communication extent of and fee charging to internet accessed terminals.

Figure 4:
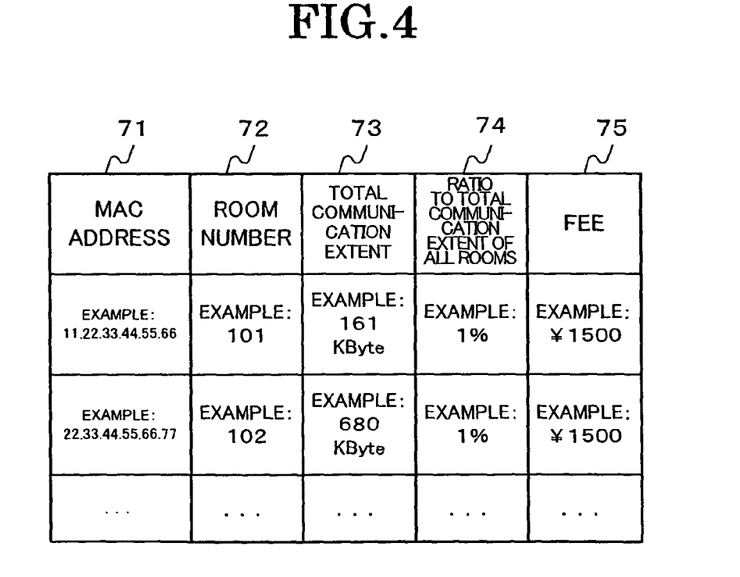
FIG. 4 shows the internal table in the authentic request/gate managing part of the terminal of the first embodiment according to the present invention.

The authentication request/gate managing part 215 has internal tables, in which table data as shown in FIG. 4 are stored. Specifically, the MAC addresses of the registered terminals are stored in a table 71, the user's room numbers of these terminals are stored in a table 72, the total communication extent used by these terminals in the pertinent month are stored in a table 73, the ratios each of the total communication extent of each of the terminals to the total communication extent of all the rooms in the pertinent month are stored in a table 74, and fees each of the distribution of the monthly usage fee of the internet access line with the ratio of each entry in the table 74 are stored in a table 75.

The operation of this embodiment will now be described.

The terminals 1A and 1B used in the rooms A and B, respectively, preliminarily register the MAC addresses and the room numbers in the tables 71 and 72, respectively, of the authentication request/gate managing part 215 in the gateway 2. The total communication extent table 73, the ratio table 74 and the fee table 75 are cleared at the time of settlement at the end of the month.

It is now assumed that the terminal 1A in the room A has started communication. The application part 111 in the terminal 1A instructs the communication control part 112 to start communication with a server on the internet via the gateway 2. The communication control part 112 controls the LAN I/F part 113 for starting the transmission and reception of with respect to the server on the internet via the gateway 2.

When the terminal 1A receives the data from the gateway 2, the LAN I/F part 211 first receives the data, and sends out the received the data to the communication control part 214. The communication control part 214 retrieves the entries in the table 71 in the authentication request/gate managing part 215 with the MAC address of the source terminal contained in the received data. Since the terminal 1A has been registered as use terminal, an identical entry is found. The communication control part 214 adds the size (i.e., received the data quantity) of that data to the found-out entry in the table 73, then stores the recalculated ratio and fee in the tables 74 and 75, respectively, and then sends out these data via the WAN I/F part 213 and then via the internet access line to the server on the internet. When no identical entry is found, the received data is discarded.

When the gateway 2 receives the data addressed to the terminal 1A from the server on the internet, the WAN I/F part 213 first receives the data, and sends out the received data to the communication control part 214. The communication control part 214 obtains the MAC address of the source terminal from the IP address thereof contained in the received data, and retrieves the entries of the table 71 in the authentication request/gate managing part 215 with the obtained MAC address. Since the terminal 1A has been registered as use terminal, an identical entry is found.

The communication control part 214 adds the size of the data to the found-out entry in the table 73, then stores the recalculated ratio and fee in the tables 74 and 75, respectively, and then sends out these data via the LAN I/F part 211 to the terminal 1A. When no identical data is found, the received data is discarded.

Transmission and reception of data with respect to the terminal 1B are the same as in the case of the terminal 1A except for the identical entry found out in the MAC address retrieval is different.

In the settlement day at the end of the month, the communication control part 214 retrieves the table 72 in the authentication request/gate managing part 215 with the room numbers, and adds the data sizes to all the identical entries in the table 75, thus determining the monthly fee of each room and charging the fee to each room.

The above embodiment permits precluding the user's claim that the use fees in the case of the common internet connection in a collective condominium or a building are fixed irrespective of different communication bands and also increasing the profit of the internet access line dealer or the manager of the collective condominium or the building.

A second embodiment of the present invention will now be described.

In the above embodiment, the building or collective condominium subscribe to a single internet access line or common use. This embodiment, however, cannot cope with a case in which an internet access line such as an existing ADSL line utilizing the existing telephone line is already installed in each room. In the present embodiment, internet access lines in the individual rooms are inter-connected for common use.

Figure 5:
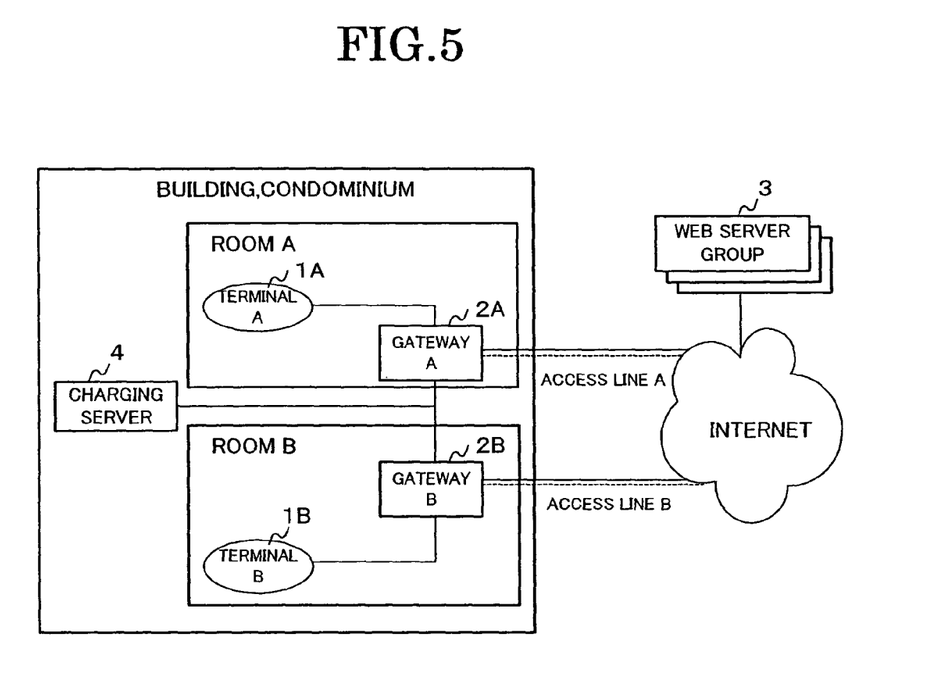
FIG. 5 shows a system structure of a second embodiment of the internet connection system according to the present invention.

FIG. 5 shows this embodiment. As shown, a room A includes a terminal 1A for accessing the internet and a gateway 2A, to which an access line A is connected. A room B also includes a terminal 1B for accessing the internet and a gateway 2B, to which an access line B is connected. The common part of a building, a collective condominium, etc. includes a fee charging server 4. On this embodiment, for the sake of brevity of description, each room uses a single terminal, but it is possible that each room uses a plurality of terminals.

Figure 6:
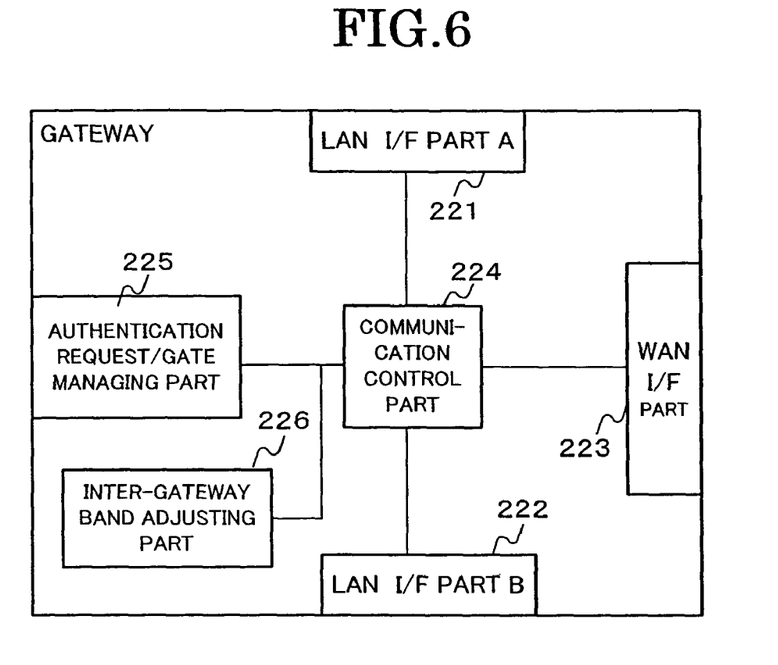
FIG. 6 shows a structure of the gateway of the second embodiment according to the present invention.

The gateway 2A has an arrangement as shown in FIG. 6, that is, it includes a LAN I/F part 221, a LAN I/F part 222, a WAN I/F part 223, a communication control part 224, an authentication request/gate managing part 225 and an inter-gateway band adjusting part 226. These process parts roughly operate as follows.

The LAN I/F part A221 sends out and receives the data on the LAN line in the room A. The LAN I/F part B222 sends out and receives the data with respect to the gateway 2B in the room B. The WAN I/F part 223 sends out and receives the data with respect to various servers on the internet via internet (access) circuit.

The communication control part 224 controls the communication between the LAN I/F part A221 and the WAN I/F part 223 and also between the LAN I/F part B222 and the WAN I/F part 223.

The authentication request/gate managing part 225 permits only terminals having registered MAC addresses to perform internet communication. When this part 225 is referred to via the communication control part 224, it performs a reply via the LAN I/F part B222 with reference to the fee charging server 4.

The inter-gateway band adjusting part 226 is referred to by the communication control part 224 and the gateway 2B, and it obtains the present communication extent on the access line A and the present communication extent on the access line B via the LAN I/F part B222 for distributing data transmission requests from the terminal 1A to the server on the internet to either gateway 2A or 2B connected to less communication extent access line.

The inter-gate band adjusting part 226 may be provided on either one or both of the gateways.

Figure 7:
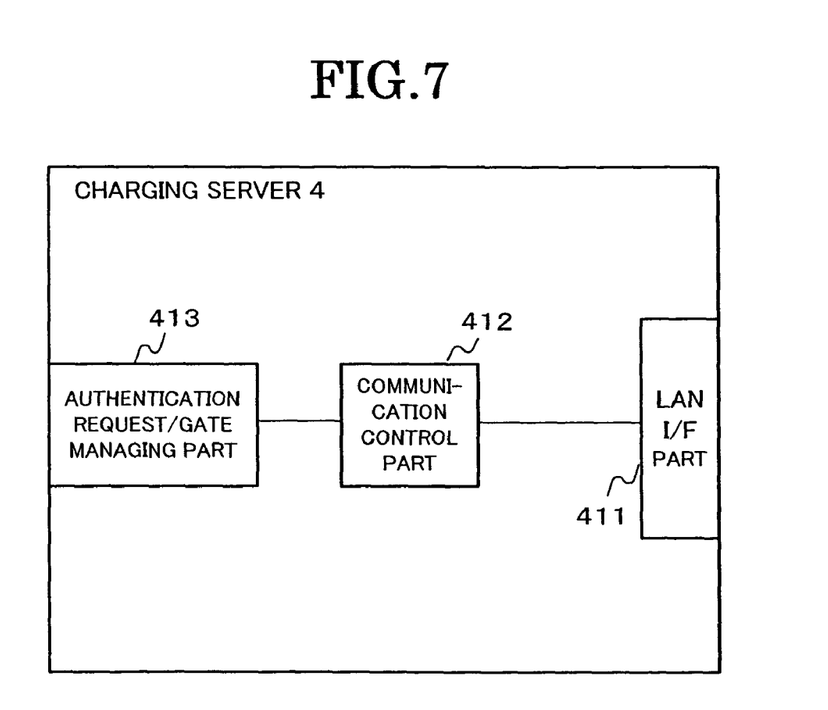
FIG. 7 shows a structure of the charging server of the second embodiment according to the present invention.

The free charging server 4 has an arrangement as shown in FIG. 7, in which a LAN I/F part 411 sends out and receives the data with respect to the gateways 2A and 2B.

A communication control part 412 controls the communication between the LAN I/F part 411 and an authentication request/gate managing part 413.

The authentication request/gate managing part 413 has internal tables, in which table data as shown in FIG. 4 are stored. Specifically, the MAC addresses of the registered terminals are stored in a table 71, the user s room numbers of these terminals are stored in a table 72, the total communication extends used by these terminals in the pertinent month are stored in a table 73, the ratios each of the total communication extent of each of the terminals to the total communication extent of all the rooms in the pertinent month are stored in a table 74 and fees as distributions of the total monthly usage fees of the internet access lines A and B with the ratios stored in the table 74 are stored in a table 75.

Now, the operation of this embodiment will be described.

First, as to the terminals 1A and 1B used in the rooms A and B, MAC addresses and room numbers are registered in the tables 71 and 72 in the authentication request/gate managing part 413 of the fee charging server. The total communication extent table 73, the ratio table 74 and the fee table 75 are cleared at the time of settlement at the end of the month.

It is now assumed that the terminal 1A in the room A has started communication. The application part 111 in the terminal 1A instructs the communication control part 112 to start communication with a server on the internet via the gateway 2A. The communication control part 112 controls the LAN I/F part 113 for starting the transmission and reception of with respect to the server on the internet via the gateway 2A.

When the terminal 1A receives the data from the gateway 2A, the LAN I/F part A221 first receives the data, and sends out the received the data to the communication control part 224. The communication control part 224 sends out an authentication request to the authentication request/gate managing part 225 with the MAC address of the source terminal contained in the data. The authentication request/gate managing part 225 transfers the size of the data together with an authentication request via the LAN I/F part B222 to the fee charging server 4.

The fee charging server 4 receives the authentication request from the gateway 2A via the LAN I/F part 411, and sends out the received data via the communication control part 412 to the authentication request/gate managing part 413.

The authentication request/gate managing part 413 retrieves the entries in the table 71. Since the terminal 1A has been registered as use terminal, an identical entry is found out. The authentication request/gate managing part 413 adds the size of that data to the found-out entry in the table 73, then stores the recalculated ratio and fee in the tables 74 and 75, respectively, and then sends out an authentication approval notice is the communication control part 412 and thence via the LAN I/F part 411 to the gateway 2A.

The authentication request/gate managing part 225 of the gateway 2A receives the authentication approval notice via the LAN I/F part 222 and the communication control part 224. After receiving the notice, the part 225 sends a gate selection request to the inter-gateway band adjusting part 226. The inter-gateway band adjusting part 226 periodically communicates with the communication control part 224 and the communication control part 224 in the gateway 2B to collect the present extent of communication between the communication control part 224 in the gateway 2A and the WAN I/F part 223 and present extent of communication between the communication control part 224 in the gateway 2B and the WAN I/F part 223.

When the inter-gateway band adjusting part 226 receives the gate selection request, it selects a low communication extent gateway on the basis of the collected communication extents, and sends out a reply to the authentication request/gate managing part 225. In this embodiment, it is assumed that the communication extent in the gateway 2A has been low, and that a reply is made to the authentication request/gate managing part 225 to select the gateway 2A.

In response to this reply, the authentication request/gate managing part 225 sends out the data received from the terminal 1A via the communication control part 224 and the WAN I/F part 223 in the gateway 2A and thence via the access line A to a server on the internet.

When the gateway 2A receives the data addressed to the terminal 1A from the server on the internet via the access line A, the WAN/I/f part 223 receives the data and send out it to the communication control part 224. The communication control part 224 obtains the MAC address of the destination terminal from the IP address thereof contained in the data, and with this address it sends out an authentication request to the authentication request/gate managing part 225.

The authentication request/gate managing part 225 transfers an authentication request to the charging server 4 via the LAN I/F part 222. The charging server 4 receives the authentication request from the gateway 2A by the LAN I/F part 411 and send it to the authentication request /gate managing part 413 via the communication control part 412.

The authentication request/gate managing part 413 retrieves the entries in the table 71. Since the terminal 1A has been registered as use terminal, an identical entry is found out. The authentication request/gate managing part 413 adds the size of that data to the found-out entry in the table 73, then stores the recalculated ratio and fee in the tables 74 and 75, respectively, and then sends out an authentication approval notice is the communication control part 412 and thence via the LAN I/F part 411 to the gateway 2A.

When the authentication request/gate managing part 225 receives the authentication approval notice via the LAN I/F part 222 and the communication control part 224, it sends out the received the data addressed to the terminal 1A via the communication control part 224 and the LAN I/F part 221 to the terminal 1A.

The transmission and reception with respect to the terminal 1B is the same as in the case with respect to the terminal 1A except for that it is the gateway 2B that first receives the data sent out from the terminal 1B to a server on the internet and that an identical entry found out in the MAC address retrieval executed at the authentication request time.

In the settlement day at the end of the month, the communication control part 225 retrieves the table 72 in the authentication request/gate managing part 215 with the room numbers, and adds the data sizes to all the identical entries in the table 75, thus determining the monthly fee of each room and charging the fee to each room.

Now, a third embodiment of the present invention will be described.

In the above embodiment shown in FIG. 5, even in case when the band corresponding to a single access line in each room can cope with the total use band in an adjacent room, each room has to use a subscribed access line independently, and this has been inefficient. In this embodiment, a wireless LAN base station of a room, in which an access line is provided, is adapted to be for use by a wireless terminal in an adjacent room, thus reducing the number of subscribed access lines. Here, the room of the user of the terminal in communication is discriminated, the used communication band of each room is recorded, and the communication fee is calculated for each room based on the used communication band.

Figure 8:
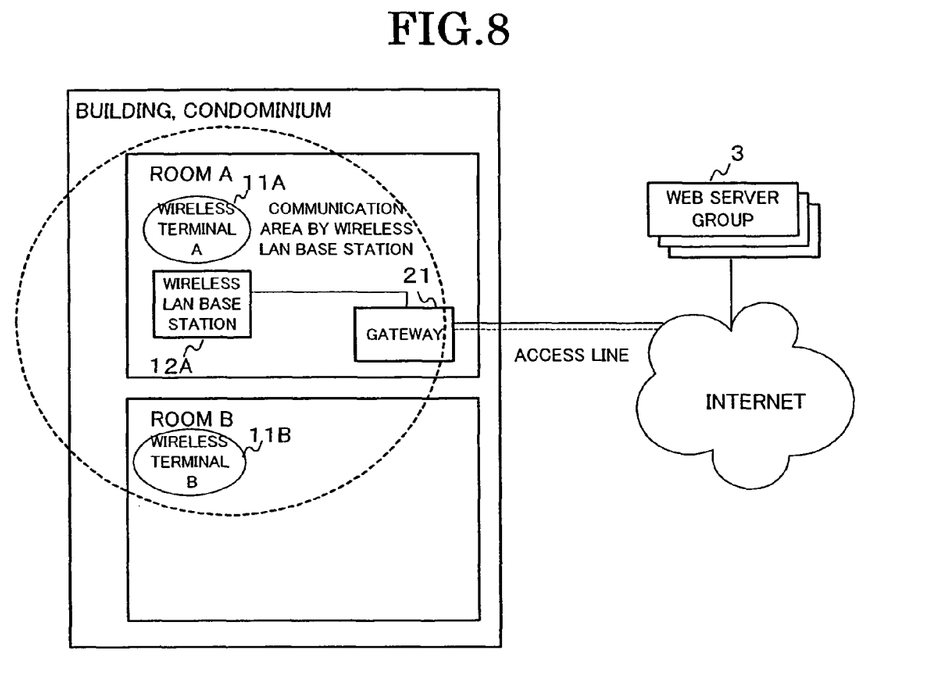
FIG. 8 shows a system structure of a third embodiment of the internet connection system according to the present invention.

Referring to FIG. 8, a room A includes a wireless terminal 11A for internet accessing and a wireless LAN base station 12A for communication with the wireless terminal 11A. A room B includes a wireless terminal 11B for internet accessing. For the sake of brevity of description, this embodiment concerns with a case where one terminal is used in each room, but a plurality of terminals may be used in each room as well.

Figure 9:
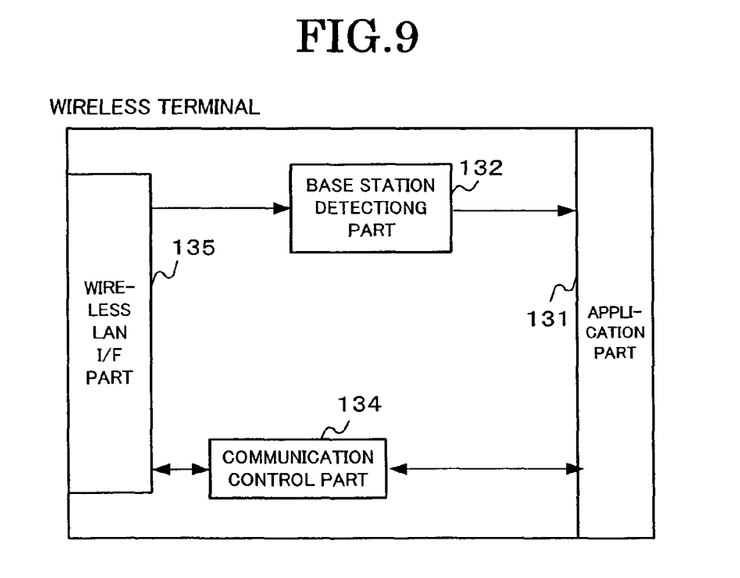
FIG. 9 shows a structure of the wireless terminal of the third embodiment according to the present invention.

The wireless terminal 11A, 11B has an arrangement as shown in FIG. 9, that is, it includes an application part 131, a base station detecting part 132, a communication control part 133 and a wireless LAN I/F part 134. These process parts operate roughly as follows.

The application part 131 serves to provide a display to the user, detect an input by the user, compare average rates of a plurality of base stations detected by the base station detecting part 132, decides a best connection destination base station and instruct the start and stop of communication with the communication control part 133.

The base station detecting part 132 detects wireless LAN base stations capable of doing communication by discriminating wireless LAN base station beacon signals from signals received from the wireless LAN I/F part 134, and informs the detected LAN base stations to the application part 131.

The communication control part 133 sends out the data received from the wireless LAN I/F part 134 and also sends out the data requested by the application part 131 for transmission to the wireless LAN I/F part 134.

Figure 10:
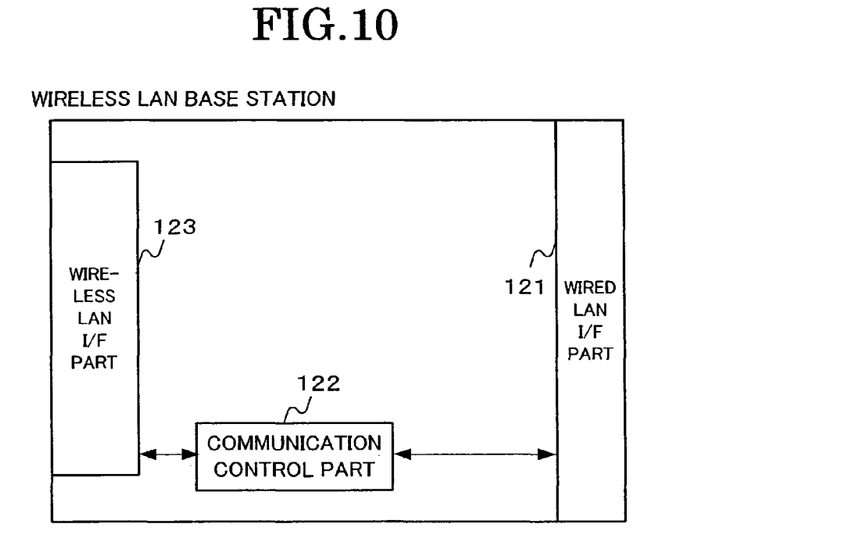
FIG. 10 shows a structure of the base station of the third embodiment according to the present invention.

The wireless LAN I/F part 134 sends out and receives the data to and from the base stations. The wireless LAN base station A has an arrangement as shown in FIG. 10, including a wired LAN I/F part 121, a communication control part 122 and a wireless LAN I/F part 123. These process parts operate as follows.

The wired LAN I/F part 121 sends out and receives the data with respect to the wireless LAN. The communication control part 122 controls transmission of the data received from the wireless LAN I/F part 123 to the wired LAN I/F part 121 and also transmission of the data received from the wired LAN I/F part 121 to the wireless LAN I/F part 123. The wireless LAN I/F part 123 sends out and receives the data to and from the wireless terminal.

The gateway 21 has an arrangement as shown in FIG. 3, that is, it includes a LAN I/F part 211, a LAN I/F part 212, a WAN I/F part 213, a communication control part 214, and an authentication request/gate managing part 215. The LAN I/F part 212 is not used in this embodiment. These process parts roughly operate as follows.

The LAN I/F part 211 sends out and receives the data on the LAN line in the room. The WAN I/F part 213 sends out and receives the data with respect to various servers on the internet via internet (access) circuit.

A communication control part 214 controls the communication between the LAN I/F part 211 and the WAN I/F part 213.

The authentication request/gate managing part 215 is referred to from the communication control part 214 in order to permit internet communication by only terminals having registered MAC addresses. The part 215 also manages the total communication extent and fee charging concerning internet accessed terminals. The unit 215 further stores the data as shown in FIG. 4 in its internal tables.

Specifically, the MAC address is stored in the table 71, the room numbers of the users of the terminals are stored in the table 72, the total communication extents used by the terminals in that month are stored in the table 73, the ratios of the terminal's total communication extents to the total communication extents of all the rooms in that month are stored in the table 74, and the fees as distributions of the monthly use fee of the internet access line by the ratios in the table 74 are stored in the table 75.

Next, the operation of this embodiment will be described.

First, the wireless terminals 11A and 11B used in the rooms A and B preliminarily register the MAC addresses and the room numbers in the tables 71 an 72 of the authentication request/gate managing parts of the gateway. The total communication extent table 73, the ratio table 74 and the fee table 75 are cleared at the time of the end-of-month settlement.

It is now assumed that the wireless terminal 11B in the room B has started communication with a server on the internet. First, the wireless LAN I/F part 135 in the wireless terminals 11B attempts to receive a beacon (i.e., communication signal) from a nearby wireless LAN base station. As shown in FIG. 8, the wireless terminal 11B is found in a beacon arrival range of the wireless LAN base station 12A. When the wireless LAN I/F part 135 in the wireless LAN terminal receives the beacon sent out from the wireless LAN base station, the base station detecting part 132, detects the reception and informs this to the application part 131. The application part 131 sends out the data via the communication control part 134 and the wireless LAN I/F part 135 to the wireless LAN base station 12A.

The wireless LAN base station 12A transfers the communication data via the wireless LAN I/F part 123, the communication control part 122 and the wired LAN I/F part 121 to the gateway 21.

When the gateway 21 receives the data from the terminal 11B, the above LAN I/F part 211 shown in FIG. 3 first receives the data, and sends out the received data to the communication control part 214. The communication control part 214 retrieves the entries in the table 71 in the authentication request/gate managing part with the MAC address of the source terminal contained in the data. Since the wireless terminal 11B has been registered as use terminal, an identical entry is found out. The communication control part 214 adds the size of the data in the found-out entry in the table 73, then stores the recalculated ratio and fee in the tables 74 and 75, respectively, and sends out the data via the WAN I/F part 213 and thence via the access line to the server on the internet. When no identical entry is found out, the data are discarded.

When the gateway 21 receives the data addressed to the wireless terminal 11B from the server on the internet, first the WAN I/F part 213 receives the data, and sends out the received data to the communication control part 214. The communication control part 214 obtains the MAC address of the destination terminal from the IP address thereof contained in the data, and retrieves the entries in the table 71 in the authentication request/gate managing part 215 with the MAC address. Since the wireless terminal 11B has been registered as use terminal, an identical entry is found out.

The communication control part 214 adds the size of the data to the found-out entry in the table 73, then stores the recalculated ratio and fee in the tables 74 and 75, respectively, and then sends out the data via the LAN I/F part 211 and thence via the wireless LAN base station to the wireless terminal 11B. When no identical entry is found out, the data is discarded.

The transmission and reception with respect to the wireless terminal 11A is the same as in the case with respect to the wireless terminal 11B except for the entry found out in the MAC address retrieval is different.

In the settlement day at the end of the month, the communication control part retrieves the table 72 in the authentication request/gate managing part with the room numbers, and adds the data to all the identical entries in the table 75, thus determining the monthly fee of each room and charging the fee to each room.

Next, a fourth embodiment of the present invention will be described.

The previous embodiment shown in FIG. 1, poses a problem in case when the maximum transfer rate between the gateway and the terminal is lower than the rate of the access line due to the presence of an obstacle or the like depending on the room or when a form of connection of gateway, wireless LAN base station and wireless terminal to one another in the mentioned order is adopted. These cases lead to a bottle neck in the case when a maximum transfer rate between wireless LAN base station and wireless terminal is low compared to the maximum transfer rate in the access line or between the gateway and the wireless LAN base station. In such a case, it may be impossible to make utmost use of the access line communication band.

In this embodiment, a wireless LAN base station and a wireless terminal are installed in each room, the wireless terminal has a means for comparing the degree of congestion (i.e., communication speed) of the base station in the room and the degree of congestion (i.e., communication speed) of the base station in the adjacent room, and the wireless terminal accesses the gateway via the base station in the adjacent room. Here, a gateway part to the access line discriminates the room of the user of the terminal in communication, records the used communication band for each room, and computes the communication fee for each room based on the used communication band.

Figure 11:
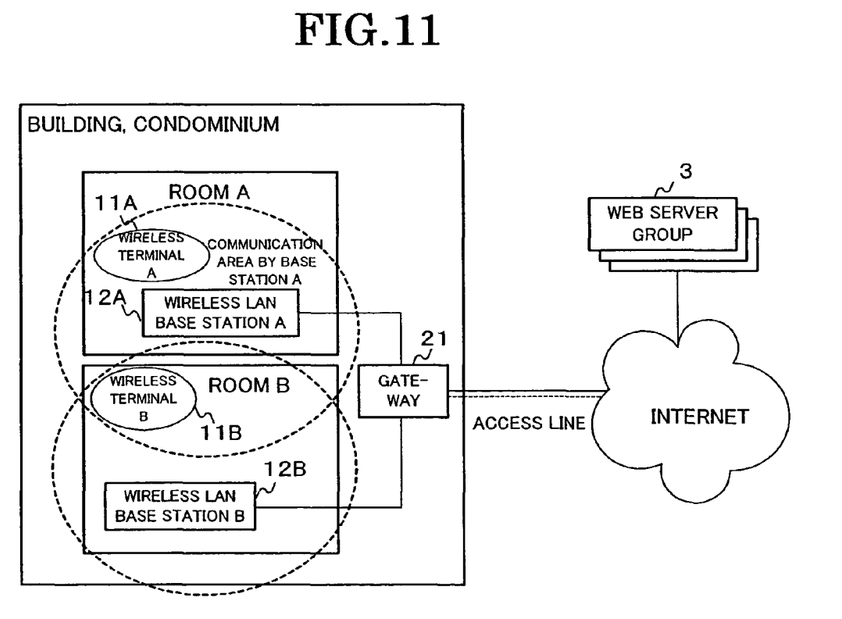
FIG. 11 shows a system structure of a fourth embodiment of the internet connection system according to the present invention.

Referring to FIG. 11, a room A includes a wireless terminal 11A for internet accessing and a wireless LAN base station 12A for communication with the wireless terminal 11A. A room B includes a wireless terminal 11B for internet accessing and a wireless LAN base station 12B for communication with the wireless terminal 11B. For the sake of brevity of description, in this embodiment one terminal is used in each room, but a plurality of terminals may be used as well in each room.

Figure 12:
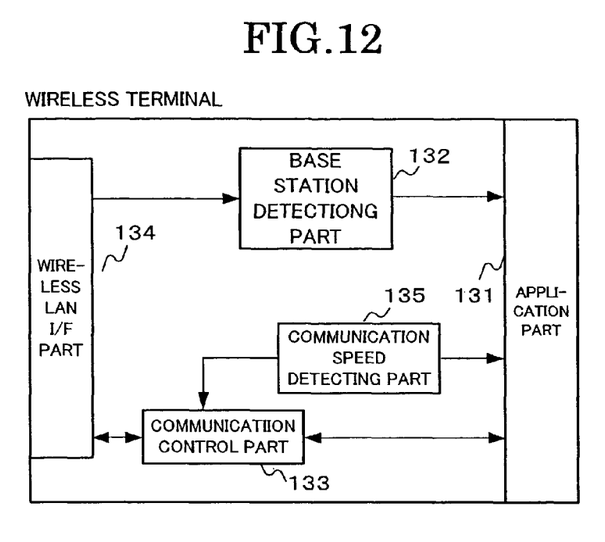
FIG. 12 shows a structure of the wireless terminal of the fourth embodiment according to the present invention.

The wireless terminals 11A and 11B each have an arrangement as shown in FIG. 12, including an application part 131, a base station detecting part 132, a communication speed detection part 135, a communication control part 133, a wireless LAN I/F part 134 and a communication speed detecting part 135. These process parts operate as follows. The communication speed detecting part 135 may not be provided in the wireless terminal.

The application part 131 serves to provide a display to the user, detect input by the user, compare the average communication speeds of a plurality of base station as detected by the base station detecting part 132, decide an optimum connection destination base station and instruct the start and stop of communication to the communication control part 133.

The base station detecting part 132 detects wireless LAN base stations capable of communicating with the same by discriminating beacon signals of wireless LAN base stations from signal received from the wireless LAN I/F part 134 and informs the detected one to the application part 131.

The communication speed detecting part 135 monitors the communication control part 133, and computes the present communication speed and the communication speed. The communication control part 133 sends out the data received from the wireless LAN I/F part 134 to the application part 131, and also sends out the data requested from the application part 131 for transmission to the wireless LAN I/F part 134.

The wireless LAN I/F part 134 sends out and receive the data with respect to the base station. The wireless LAN base stations 12A and 12B have an arrangement as shown in FIG. 10 noted above, including a wired LAN I/F part 121, a communication control part 122 and a wireless LAN I/F part 123. These process parts operate as follows.

The wired LAN I/F part 121 sends out and receive the data with respect to the wired LAN. The communication control part 122 controls transmission of the data received from the wireless LAN I/F part 123 to the wired LAN I/F part 121 and also transmission of the data received from the wired LAN I/F part 121 to the wireless LAN I/F part 123. The wireless LAN I/F part 123 sends out and receives the data with respect to the wireless terminal.

The gateway 21 has an arrangement as shown in FIG. 3, that is, it includes a LAN I/F part 211, a LAN I/F part 212, a WAN I/F part 213, a communication control part 214, and an authentication request/gate managing part 215. These process parts roughly operate as follows.

The LAN I/F part 211 sends out and receives the data on the LAN line in the room A. The LAN I/F part 212 sends out and receives the data on the LAN line in the room B. The WAN I/F part 213 sends out and receives the data with respect to various servers on the internet via internet (access) circuit.

The communication control part 214 controls the communication between the LAN I/F part 211 and the WAN I/F part 213, between the LAN I/F part 211 and the LAN I/F part 212 and also between the LAN I/F part 212 and the WAN I/F part 213.

The authentication request/gate managing part 215 is referred to by the communication control part 214 in order that only terminals having registered MAC addresses can perform internet communication. The part 215 also manages the total communication part and fee charging of the internet accessed terminals. The part 215 further stores the data as shown in FIG. 7 in its internal tables.

The MAC addresses of terminals are stored in the table 71, the room numbers of the users of these terminals are stored in the table 72, the total communication extents used by these terminals in that month are stored in the table 73, the ratios of the total communication extents of the terminals to the total communication extent of all the rooms in that month are stored in the that table 74, and the fees as distributions of the monthly use fee of the internet access line with the ratios in the table 74 are stored in the table 75.

The operation of this embodiment will now be described in detail.

As to the wireless terminals 11A and 11B used in the rooms A and B, the MAC addresses and the room numbers are stored in the tables 71 and 72 in the authentication request/gate managing part 215 of the gateway 21. The total communication extent table 73, the ratio table 74 and the fee table 75 are cleared at the end-of-month settlement.

When the wireless terminal 11B is started, the wireless LAN I/F part 134 of the wireless terminal 11B attempts to receive a beacon (i.e., communication signal) of a nearby wireless LAN base station. As shown in FIG. 11, the wireless terminal 11B is found in the beacon arrival ranges of the wireless LAN base stations 12A and 12B. Here, it is assumed that the wireless LAN I/F part 134 first receives a beacon sent out from the wireless LAN base station 12A.

The base station detecting part 132 detects the reception and informs the same to the application part 131. The application part 131 sends out and receives dummy data for communication speed measurement via the communication control part 133 and the wireless LAN I/F part 134 to the base station 12A, and the communication speed detecting part 135 calculates the average communication speed and informs the calculation result to the application part 131.

Next, the wireless LAN I/F part 134 attempts to receive a beacon (i.e., communication signal) of a different wireless LAN base station, and receives the beacon of the wireless LAN base station 12B. The base station detecting part 132 detects and informs this to the application part 131. The application part 131 sends out and receives dummy data for communication speed measurement with respect to the base station 12B via the communication control part 133 and the wireless LAN I/F part 134, and the communication speed detecting part 135 calculates the average communication speed and informs the calculation result to the application part 131. Since no other beacon than those from the base stations 12A and 12B arrives at the application part 131 compares the average communication speeds calculated by the base stations 12A and 12B.

It is assumed that, as a result of the comparison, the average communication speed of the wireless LAN base station 12A has been found to be higher than the average communication speed of the wireless LAN base station 12B, and the application part 131 starts communication with the wireless LAN base station 12A via the communication control part 133 and the wireless LAN I/F part 134.

The wireless LAN base station 12A transfers the communication data via the wireless LAN I/F part 123, the communication control part 122 and the wired LAN I/F part 121 to the gateway.

When the gateway 21 receives the data from the wireless terminal 11B, first the LAN I/F part 211 receives and send out the data to the communication control part 214. The communication control part 214 retrieves the entries in the table 71 in the authentication request/gate managing part with the MAC address of the source terminal contained in the data. Since the wireless terminal 11B has been registered as use terminal, an identical entry is found out. The communication control part 214 adds the size of the data to the found-out entry in the table 73, then stores the recalculated ratio and fee in the tables 74 and 75, respectively, and sends out these data via the WAN I/F part 213 and hence via the access line to the service on the internet. When no identical entry is found out, the data are discarded.

When the gateway 21 receives the data addressed to the wireless terminal 11B from the server on the internet, first the WAN I/F part 213 receives the data, and sends out the received data to the communication control part 214. The communication control part 214 obtains the MAC address of the destination terminal from the IP address thereof contained in the data, and retrieves the entries in the table 71 in the authentication request/gate managing part with the obtained MAC address.

Since the wireless terminal 11B has been registered as use terminal, an identical entry is found out. The communication control part 214 adds the size of the data to the found-out entry in the table 73, then stores the recalculated ratio and fee in the tables 74 and 75, respectively, and then sends out the data via the LAN I/F part 211 and thence via the wireless LAN base station 12A to the wireless terminal 11B. When no identical entry is found out, the data are discarded.

The transmission and reception with respect to the wireless terminal 11A is the same as those with respect to the wireless terminal 11B except for that the identical entry found out in the MAC address retrieval is different.

In the settlement day at the end of the month, the communication control part retrieves the table 72 in the authentication request/gate managing part with the room numbers, and adds the data sizes to all the identical entries in the table 75, thus determining the monthly fee of each room and charging the fee to each room.

Next, a fifth embodiment of the present invention will be described.

The above embodiment shown in FIG. 5 poses a problem in case when the maximum transfer rate between the gateway A or B and the terminal is lower than the rate in the access lines A and B in combination (A+B) due to such cause as simultaneous use of two applications depending on room or when a form of connection of gateway, wireless LAN base station and wireless terminal to one another is adopted. These cases lead to a bottle neck in the case of lower maximum transfer rate between wireless LAN base station and wireless terminal than the rate of access lines A and B in combination or the maximum transfer rate between gateway and wireless LAN base station. In this case, it may be impossible to make utmost (maximum) use of the access line communication band.

In this embodiment, a wireless LAN base station and a wireless terminal are installed in each room, and the wireless terminal compares the degree of congestion in the base station in a room, and the degree of congestion in the base station in an adjacent room. The wireless terminal accesses the gateway via the base station in an adjacent room. A gateway part to the access line discriminates the room of the user of the terminal in communication, records the used communication band for each room, and computes the communication fee for each room based on the used communication band.

Figure 13:
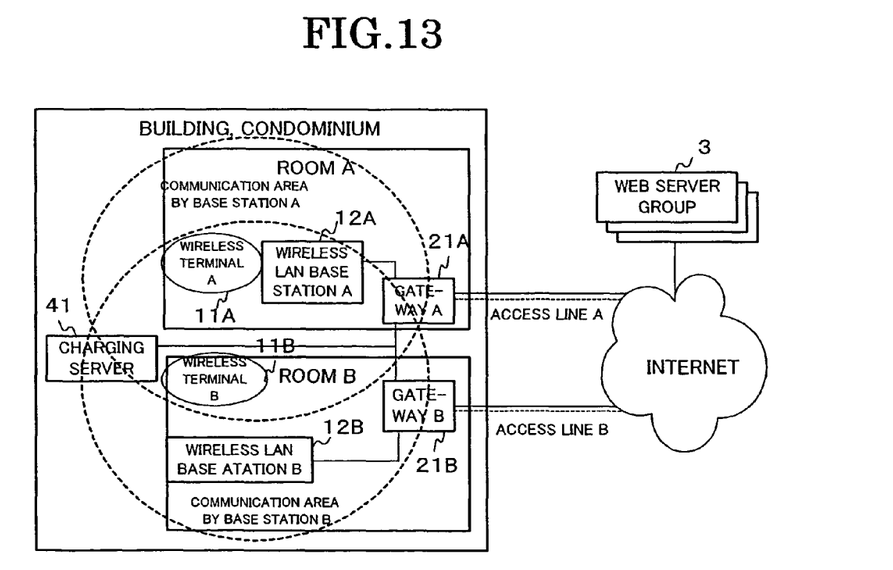
FIG. 13 shows a system structure of a fifth embodiment of the internet connection system according to the present invention.

Referring to FIG. 13, a room A includes a wireless terminal 11A for internet accessing and a wireless LAN base station 12A for communication with the wireless terminal and gateway 21A led to an access line A. A room B includes a terminal 11B for internet accessing, a wireless LAN base station 12B for communication with the wireless terminal, and a gateway 21B led to an access line B. A common part of a building or a collective condominium includes a fee charging server 41. For the sake of brevity of description, in this embodiment only one terminal is used in each room, but a plurality of terminals may be used in each room as well.

The wireless terminal 11A, 11B has an arrangement as shown in FIG. 12, that is, it includes an application part 131, a base station detecting part 132, a communication control part 133, a wireless LAN I/F part 134 and a communication speed detecting part 135. These process parts operate roughly as follows.

The application part 131 serves to provide a display to the user, detect an input by the user, compare average rates of a plurality of base stations detected by the base station detecting part 132, decides a best connection destination base station and instruct the start and stop of communication with the communication control part 133.

The base station detecting part 132 detects wireless LAN base stations capable of communicating by discriminating beacon signals of the wireless LAN base stations from signal received from the wireless LAN I/F part 134, and informs the detected base stations to the application part 131.

The communication speed detecting part 135 monitors the communication control part 133, and computes the present communication speed and the communication speed. The communication control part 133 sends out the data received from the wireless LAN I/F part 134 to the application part 131 and also sends the data requested from the application part for communication to the wireless LAN I/F part 134.

The wireless LAN I/F part 134 sends out and receives the data to and from the base stations. The wireless LAN base station 12A, 12B has an arrangement as shown in FIG. 10, including a wired LAN I/F part 121, a communication control part 122 and a wireless LAN I/F part 123. These process parts operate as follows.

The wired LAN I/F part 121 sends out and receives the data with respect to the wired LAN. The communication control part 122 controls transmission of the data received from the wireless LAN I/F 123 to the wired LAN I/F part 121 and also transmission of the data received from the wired LAN I/F part 121 to the wireless LAN I/F part 123. The wireless LAN I/F part 123 sends out and receives the data to and from the wireless terminal.

The gateway 21A has an arrangement as shown in FIG. 6, that is, it includes a LAN I/F part 221, a LAN I/F part 222, a WAN I/F part 223, a communication control part 224, an authentication request/gate managing part 225 and an inter-gateway band adjusting part 226. These process parts roughly operate as follows.

The LAN I/F part 221 sends out and receives the data on the LAN line in the room A. The LAN I/F part 222 sends out and receives the data to and from the gateway 21B in the room B. The WAN I/F part 223 sends out and receives the data with respect to various servers on the internet via internet (access) circuit.

The communication control part 224 control communication between the LAN I/F part 221 and the WAN I/F part 223 and also between the LAN I/F part 222 and the WAN I/F part 223.

When the authentication request/gate managing part 225 is referred to from the communication control part 224 in order that the only the terminals having registered MAC addresses can perform internet communication, and makes a reply by referring the fee charging server via the LAN I/F part 222.

The inter-gateway band adjusting part 226 is referred to from the communication control part 224 and the gateway 21B, obtains the present communication extent of the access line A and the present communication extent of the access line B via the LAN I/F part 222, and distributes the data transmission requests to the servers on the internet to the gateways 21A and 21B.

The free charging server has an arrangement as shown in FIG. 7, in which a LAN I/F part 411 sends out and receives the data with respect to the gateways 21A and 21B.

A communication control part 412 controls the communication between the LAN I/F part 411 and an authentication request/gate managing part 413.

The authentication request/gate managing part 413 stores the data shown in FIG. 4 noted above as internal tables. Specifically, the MAC addresses of the terminals are stored in the table 71, the room numbers of user's terminal are stored in the table 72, the total communication extents used by the terminals are stored in the table 73, the ratios of the total communication extents of the terminals to the total-communication extent of all the rooms are stored in that month in the table 74, and the fees as distributions of the total monthly use fees of the internet access lines A and B with the ratios in the table 74 are stored in the table 75.

The operation will now be described on detail.

The wireless terminals 11A and 11B used in the rooms A and B each preliminarily register the MAC addresses and the room numbers in the tables 71 and 72, respectively, in the authentication request/gate managing part of the fee charging sever. The total communication extent table 73, the ratio table 74 and the fee table 75 are cleared at the end-of-month settlement.

When the wireless terminal 11B is started, the wireless LAN I/F part 135 of the wireless terminal 11B attempts to receive a beacon (i.e., communication signal) of a nearby wireless LAN base station. As shown in FIG. 13, the wireless terminal 11B are found in the beacon arrival ranges of the wireless LAN base stations 12A and 12B. Here it is assumed that a beacon sent out from the wireless LAN base station 12A first receives the wireless LAN I/F part 135.

The base station detecting part 132 detects the reception, and informs this to the application part 131. The application part 131 sends out and receives dummy data for communication speed measurement with respect to the base station 12A via the communication control part 133 and the wireless LAN I/F part 134. The communication speed detecting part 135 calculates the average communication speed, and informs the result of calculation to the application part 131.

Next, the wireless LAN I/F part 134 attempts to receive a beacon (i.e., communication signal) of a different wireless LAN base station, and receives a beacon from the wireless base station 12B. The base station detecting part 132 detects the reception, and informs this to the application part 131. The application part 131 sends out and receives dummy data for communication speed measurement with respect to the base station B via the communication control part 133 and the wireless LAN I/F part 134, and the communication speed detecting part 135 calculates the average communication speed and informs the result of calculation to the application part 131.

Since no other beacon arrives at than those from the base stations 12A and 12B, the application part 131 compares the average communication speeds measured by the base stations 12A and 12B. It is assumed that it is found, as a result of comparison, that the average communication speed with respect to the wireless LAN base station 12A is higher than the average communication speed with respect to the wireless LAN base station 12B, and the application part 131 starts communication with respect to the wireless LAN base station 12A via the communication control part 133 and the wireless LAN I/F part 134.

The wireless LAN base station 12A transfers the communication data via the wireless LAN I/F part 123, the communication control part 122 and the wireless LAN I/F part 121 to the gateway 21A.

When the gateway 21A receives the data from the wireless terminal 11B, first the LAN I/F part 221 receives the data, and sends out the received data to the communication control part 224. The communication control part 224 sends out an authentication request to the authentication request/gate managing part 225 with the MAC address of the source terminal contained in the data. The authentication request/gate managing part 225 transfers the authentication request together with the size of the data via the LAN I/F part 222 to the fee charging part.

The fee charging server receives the authentication request from the gateway 21A in the LAN I/F part 411, and sends out the received data from the communication control part 412 to the authentication request/gate managing part 413. The authentication request/gate managing part 413 retrieves the entries in the table 71. Since the wireless terminal 11B has been registered as use terminal, an identical entry is found out. The authentication request/gate managing part 413 adds the size of the data to the found-out entry in the table 73, then stores the recalculated ratio and fee to the tables 74 ad 75, respectively, and then sends out an authentication approval notice via the communication control part 412 and thence via the LAN I/F part 411 to the gateway 21A.

The authentication request/gate managing part 225 in the gateway 21A receives an authentication approval notice via the LAN I/F part 222 and the communication control part 224. After receiving the notice, the part 222 sends out a gate selection request to the inter-gateway band adjusting part 226. The inter-gateway band adjusting part 226 has been periodically communicating with the communication control part 224 and the communication control part 224 of the gateway 21B to collect present extent of communication between the communication control part 224 of the gateway 21A and the WAN I/F part 223 and the present extent of communication between the communication control part 224 of the gateway 21B and the WAN I/F part 223 (i.e., communication speed of the present communication).

The inter-gateway band adjusting part 226, receiving the gate selection request, selects a lower communication extent gateway on the basis of the collected communication extent, and sends out a reply to the authentication request/gate managing part 225. In this embodiment, it is assumed that the communication extent of the gateway 21A has been lower, and the part 226 sends out a reply to the authentication request/gate managing part 225 to select the gateway 21A.

According to the reply, the authentication request/gate managing part 225 sends out the data received from the wireless terminal 11B via the communication control part 224 in the gateway 21A and the WAN I/F part 223 and thence via the access line A to a server on the internet.

When the gateway 21A receives the data addressed to the wireless terminal 11B from the server on the internet via the access line, first the WAN I/F part 223 receives the data, and sends out the received data to the communication control part 224. The communication control part 224 obtains the MAC address of the destination terminal from the IP address of the destination terminal contained in the data, and sends out an authentication request to the authentication request/gate managing part 225 with the MAC address. The authentication request/gate managing part 225 transfers the authentication request together with the data size via the LAN I/F part 222 to the fee charging server.

The fee charging server receives the authentication request from the gateway 21A in the LAN I/F part 411, and sends out the received data from the communication control part 412 to the authentication request/gate managing part 413. The authentication request/gate managing part 413 retrieves the entries in the table 71. Since the wireless terminal 11B has been registered as use terminal, an identical entry is found out. The authentication request/gate managing part 413 adds the size of the data to the found-out entry in the table 73, then stores the recalculated ratio and fee to the tables 74 ad 75, respectively, and then sends out an authentication approval notice via the communication control part 412 and thence via the LAN I/F part 411 to the gateway 21A.

When the authentication request/gate managing part 225 receives the authentication approval notice via the LAN I/F part 222 and the communication control part 224, it sends out the received data addressed to the terminal 11A via the communication control part 224 and the LAN I/F part 221 to the wireless terminal 11B.

In the settlement day at the end of the month, the communication control part retrieves the table 72 in the authentication request/gate managing part 215 with the room numbers, and adds the data sizes to all the identical entries in the table 75, thus determining the monthly fee of each room and charging the fee to each room.

Next, a sixth embodiment of the present invention will be described.

In the embodiments shown in FIGS. 1, 5, 8, 11 and 13, the communication band is subject to variation depending on the extent of coexistence in the other part of the common use. Therefore, these embodiments can not cope with the case, in which it is desired to secure a fixed communication band.

In a modification of these embodiments, a means for keeping the communication band of a certain room to be no lower than a fixed level and a means for changing the fixed band based on the time zone.

Figure 14:
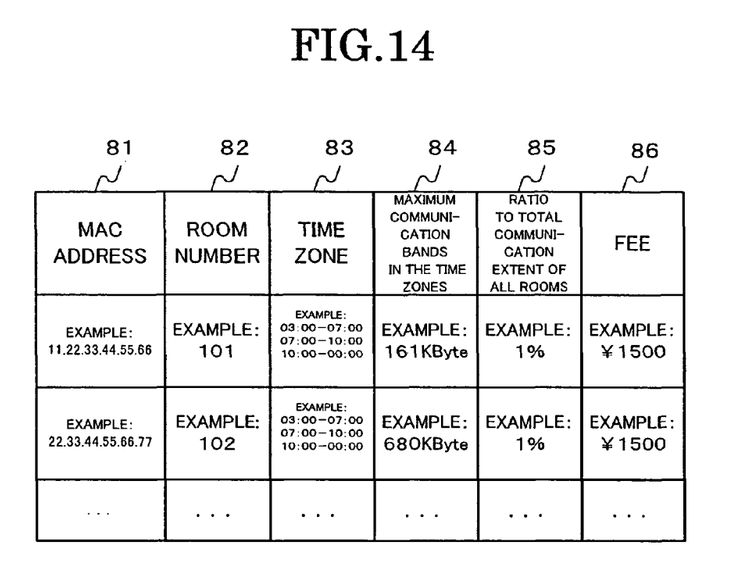
FIG. 14 shows the internal table in the authentic request/gate managing part of the terminal of the fifth embodiment according to the present invention.

More specifically, in the embodiments shown in FIGS. 1, 8 and 11, constituent the data shown in FIG. 14 are stored in internal tables in the authentication request/gate managing part 215 of the gateway. Specifically, the MAC addresses of registered terminals in the rooms are stored in a table 81, the room numbers of the rooms are stored in a table 82, time zones are stored in a table 83, the maximum communication bands in the individual time zones are stored in a table 84, the maximum daily communication extents as the sums of all the times are stored in a table 85, and the fees as distributions of the monthly use fee of the access line with the ratios in the table 85 are stored in the table 86.

The operation of the communication control part 214 is modified as follows.

When the communication control part 214 receives the data sent out to the internet, it retrieves the entries in the table 82 in the authentication request/gate managing part with the MAC address of the destination terminal contained in the data. The part 214 then retrieves for an entry identical with the present time from the found-out entry in the table 83, then reads out the maximum communication band at that time from the table 84. When the sum of the communication bands of all the terminals in the room, in which that terminal is included, is not less than maximum communication band, the part 214 stores the send-out the data in the waiting matrix, and causes no data transmission until the sum becomes less than the maximum communication band. When the next transmission data is received in this state, this data is also stored after the end of the present waiting matrix. When the sum becomes less than the maximum communication band, the part 214 sequentially sends out the waiting matrix data to the access line.

In the settlement day at the end of the month or the like, the table 82 in the authentication request/gate managing part 82 is retrieved with the room numbers, and the fee amounts in the identical entries in the table 86 are charged to the rooms, respectively, as monthly fees thereof.

In a modification of the embodiments shown in FIGS. 4 and 12, the data shown in FIG. 14 are stored in internal tables in the authentication request/gate managing part 413 in the fee charging server. Specifically, room numbers are stored in the table 82, the MAC addresses of the registered terminals in the rooms are stored in the table 81, time zones are stored in the table 83, the maximum communication bands in the time zones are stored in the table 84, the ratios of the maximum daily communication extents in the time sum are stored in the table 85 in the maximum daily communication extent of the access line are stored in the table 86, and fees as distributions of the monthly use fee of all the access lines with the ratios in the table 85 are stored in the table 86.

Also, the operation of the authentication request/gate managing part 413 in the fee charging server are modified as follows.

When the authentication request/gate managing part 413 receives an authentication request, it retrieves the entries in the table 82. The part 413 retrieves the entries in the table 81 in the authentication request/gate managing part 413 with the MAC address of the source terminal contained in the authentication request data. The part 413 retrieves an entry identical with the present time from the found-out entry in the table 83, reads out the maximum communication band from the table 84 in that time, and sends out this data together with an authentication approval notice via the communication control part 412 and thence via the LAN I/F part 411 to the gateways 2A and 21A or 2B and 21B.

The authentication request/gate managing part 225 in each of the gateways 2A and 21A or 2B and 21B receives the authentication approval notice via the LAN I/F part 222 and the communication control part 224. After receiving the authentication approval notice, the part 225 sends out a gate selection request to the inter-gateway band adjusting part 226. The inter-gateway band adjusting part 226 periodically communicates with the communication control part 224 and the communication control part 224 of a different gateway to collect the present extent of communication between the communication control part 224 of the own gateway and the WAN I/F part 223 and the extent of communication between the communication control part 224 of the other gateway and the WAN I/F part 223. After receiving the gate selection request, the inter-gateway band adjusting part 226 selects a low communication extent on the basis of the collected communication extents.

However, when the sum of the present communication bands of all the terminals in the room, to which that terminal belongs, is above the maximum communication band of the room, to which the terminal in that time belongs, sent together with the authentication approval notice, the inter-gateway band adjusting part 226 stores the sent-out the data in a waiting matrix, and sends out no reply to the authentication request/gate managing part 225 until the communication band becomes less than the maximum communication band. When the next sent-out the data is received in this state, the part 226 stores the data after the end of the present waiting matrix.

When the communication band becomes less than the maximum communication band, the inter-gateway band adjusting part 226 selects a low communication extent gateway afresh, and sequentially sends out the waiting matrix data together with a gate selection result to the authentication request/gate managing part 225.

In the settlement day at the end of the month or the like, the table 81 in the authentication request/gate managing part 413 is retrieved, and the fee amounts of the identical entries in the table 86 are charged to the rooms as monthly fees therefor.

Next, a seventh embodiment of the present invention will be described.

In the above embodiments shown in FIGS. 1, 5, 8, 11 and 13, in case where a certain room is used as a shop, no business model effective for increasing the sales amount of the shop has been available.

In the embodiment, desired house-holders are each made to bear a part of the communication fee charged to the shop and pay a credit of an amount corresponding to the sum of the part of the fee and a predetermined ratio thereof. The house-holder may pay a fee corresponding to that amount.

Specifically, in the embodiments shown in FIGS. 1, 8 and 11, in the settlement day at the end of the month or the like, the table 82 in the authentication request/gate managing part is retrieved with the room number of the shop, a part of the amount in the identical entries in the table 86 are uniformly distributed to the rooms desiring the credits, and a request for issuing credits corresponding to the amounts obtained by increasing the distributed amounts in a predetermined ratio is sent out to the shop. Afterwards, the usual settlement process is made. It is of course possible to pay fees of the corresponding amounts.

In the embodiments shown in FIGS. 5 and 13, in the settlement day at the end of the month or the like the table 82 in the authentication request/gate managing part 413 is retrieved with the room number of the shop, a part of the amount in the found-out entry in the table 86 is uniformly distributed to the rooms desiring the credits in the table 86, and a request for issuing credit of amounts obtained by increasing the distributed amounts in a predetermined ratio is send out to the shop. Afterwards, the usual settlement process is made.

As has been described in the foregoing, according to the present invention, even in the case where the frequency of use and the maximum times-of-use time zone fluctuate in dependence on the purposes of the individual rooms (such as condominium, office and shop), communication bands are dynamically distributed from rooms, in which the communication bands are redundant, to rooms, in which the communication bands are insufficient, and the fees are distributed in dependence on the level of the total used communication band, and it is thus possible to realize impartial band distribution. It is thus possible to make up for insufficient bands even though the communication fee is reduced in rooms, in which the frequency band has not been used so much, and slightly increased in rooms, in which the frequency band has been insufficient.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An internet connection system, comprising:
a plurality of wireless LAN base stations, each located in a corresponding predetermined location;
a wireless terminal located in each of the predetermined locations, each wireless terminal wireless LAN connected to a sub-plurality of the wireless LAN base stations, one of the sub-plurality of wireless LAN base stations located in the same predetermined location as the wireless terminal and the other of the sub-plurality of wireless LAN base stations located in a different location,
wherein each of the wireless LAN base stations is respectively connected to the internet via a corresponding gateway and a corresponding access line connected to the gateway, and
wherein the wireless LAN base stations, wireless terminals and gateway are arranged to measure a communication speed from each of the wireless terminals to the internet through each of the sub-plurality of wireless LAN base stations to which the wireless terminal is wireless LAN connected, and are arranged to selectively connectively connect the wireless terminals to the internet through the gateway and through the wireless LAN base station of the sub-plurality of wireless LAN base stations having the highest measured communication speed,
and a charging server, connected to the common gateway, arranged to record a communication band usage for each of the terminals indicating a quantity of communications between each of the terminals and the internet, based on the unique location identifiers within the communications, and arranged to generate a communication fee data unique to each of the wireless terminals, based on a ratio of the recorded communication band usage for the wireless terminal associated with the data to a total of the recorded communication band usage of all of the wireless terminals,
wherein the gateway and the terminals are arranged to assign a preset maximum communication speed for each location, and are arranged to detect a communication band sum for each location, representing a sum of communications generated by all terminals associated with the location, and are arranged to set, in response to the detected communication band sum exceeding the maximum communication speed, a communication operation of all of the terminals associated with the location to a waiting state and to resume the communication operation of all of the terminals in the location when the detected communication band sum becomes lower than the maximum communication speed for the location.

2. The internet communication system according to claim 1, wherein the gateway and the terminals are arranged to assign a quantity of communication bands to each of the predetermined locations, and are arranged to re-assign a quantity of the communication bands assigned to a predetermined location to another of the predetermined locations, and are arranged to generate a use fee data based on said re-assigning.

3. The internet communication system according to claim 1, wherein each of the terminals are arranged to include a MAC address and to generate communication reflecting the MAC address, and
wherein the gateway includes a register to store authorized MAC addresses for each of the predetermined locations, and
wherein the gateway is arranged to enable communications between each of the terminals and the internet based on the MAC address of the communicating terminal being one of the stored authorized MAC addresses, and
wherein the gateway is arranged to detect and store for each of the predetermined locations the total communication band usage of all the terminals having authorized MAC addresses associated with the location, and to detect and store, for each of the locations, the ratio of the total communication band usage of the terminals having authorized MAC addresses associated with the location to the total communication band usage of all the terminals having authorized MAC addresses associated for any of the locations, whereby distributions of the ratios are used for fee computation.

4. The internet communication system of claim 1, wherein the locations are rooms.

* * * * *